Sept. 14, 1926.
A. OBERLE
1,599,429
PROCESS OF RECOVERING LIGHT OILS FROM RESIDUAL PRODUCTS
Filed April 14, 1924
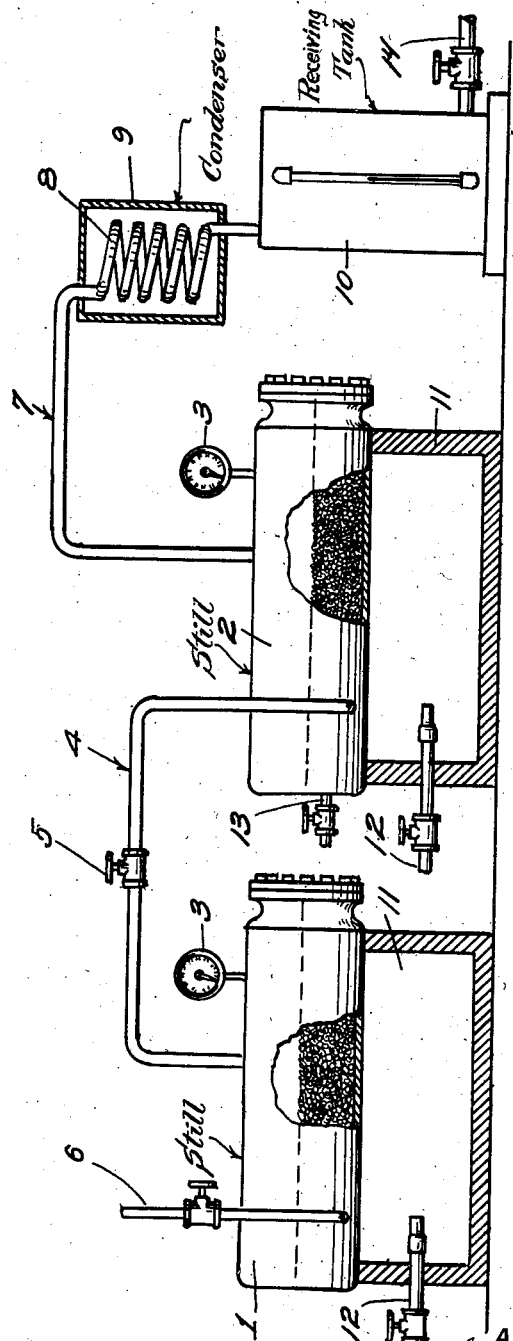
Witness:
R. E. Hamilton
INVENTOR.
ALFRED OBERLE
BY
ATTORNEY.

Patented Sept. 14, 1926.

1,599,429

UNITED STATES PATENT OFFICE.

ALFRED OBERLE, OF OAK PARK, ILLINOIS, ASSIGNOR OF ONE-HALF TO THOMAS E. SCOFIELD, OF KANSAS CITY, MISSOURI.

PROCESS OF RECOVERING LIGHT OILS FROM RESIDUAL PRODUCTS.

Application filed April 14, 1924. Serial No. 706,340.

This invention relates to improvements in a process and apparatus for recovering light oils from residual products, and refers more particularly to a process in which residual materials, commonly thrown away as waste or used as fuel, may be further treated to extract a considerable quantity of valuable light distillates and at the same time improving the resultant cokey material so that it may be more readily and advantageously utilized as fuel.

Among the objects of the invention are, to provide a process in which such residual substances as pressure tar resulting from the destructive distillation of hydrocarbon oil, petroleum carbon recovered from treatment of various types of oils and enumerable tarry products such as the sludgy masses collecting in stills and apparatuses used in the treatment of hydrocarbon materials, may be further treated and additional light distillates removed; to provide an apparatus for carrying out this process and, in general, to provide a process and apparatus of the character referred to.

The single figure is a diagrammatic side elevational view of the apparatus.

In treating hydrocarbon oils for the recovery of their lighter fractions which are extracted as benzine or pressure distillate and subsequently treated to produce commercial motor fuel or gasoline, there is, in addition to these lighter products, a resultant material consisting of heavy liquid or if the process has been continued sufficiently long at high temperatures in place of the heavy liquids a cokey material will result. These products taking the form of heavy liquids containing colloidal carbon either in suspension or deposited as a colloidal mass resembling mud in its consistency, or petroleum carbon which may contain more or less of these heavy residual liquids, are usually either thrown away as waste or, if the residual liquids or cokey material is sufficiently treated to remove the sludgy mass therefrom, it may be utilized as fuel, and when so used, called "petroleum coke."

The herein described process has to do with the treatment of this residual oil, and petroleum carbon to recover therefrom not only a high quality carbon which can readily be used as a fuel similar to coke produced from coal, but in addition a relatively light distillate can be recovered from the residual materials which, when treated, results in a high quality light distillate resembling in its characteristics a cracked distillate. This light distillate may be refined and recovered as any cracked distillate to produce gasoline or a blending product used in the production of gasoline-like motor fuels.

In the drawings, 1 and 2 are pressure bombs equipped with pressure gauges 3 and connected by means of a pipe 4 controlled by a valve 5. A valve control steam pipe is connected to the bomb 1 at 6, while the vapor line 7 passes off from the bomb 2 to a condenser coil 8 mounted in the condenser box 9. The discharge end of the condenser coil is connected to a receiving or settling tank 10. The bombs 1 and 2 are mounted above furnaces 11, preferably heated by means of gas burners diagrammatically shown at 12. The apparatus is heavily lagged to prevent loss of heat through radiation.

The bomb 1 is filled with carbon or petroleum sludge such as that described as residual material resulting from the treatment of hydrocarbon products. It may be in the form of a relatively viscous liquid such as a pressure tar recovered from a cracking still or in the form of petroleum carbon from which all of the tarry products has not been removed. Carbon, resulting from pressure distillation, has normally a crumbly structure. This residual carbon, having a considerable quantity of tarry products present, is placed in the bomb 1 and is there raised to temperatures sufficient to drive off the volatile material from the residual material or cokey mass placed in the bomb. To facilitate this distillation, steam may be introduced through the pipe 6 to promote volatilization.

In the bomb 2 is placed a petroleum coke, from which substantially all of the volatile material has been removed, or a highly absorbent carbon, such as that described in my application Serial No. 672,648, filed November 3, 1923. In this prior application was described a process in which the petroleum carbon was broken into suitable size and was subjected to a heat treatment, with or without steam, to expel from the carbonaceous material volatile hydrocarbons and impurities. Subsequent to this heat treatment, there was an optional acid treatment, preferably effected with the use of mineral acids such as sulphuric or nitric acid. After this the carbonaceous material was given a treatment with water to remove the acids and subsequently a final heat treatment. This resulting absorbent petroleum carbon is characterized by a honey-combed pumice-like structure and consists solely of pure carbon,—the volatile products having been removed or extracted.

The vapors from the bomb 1 pass over through the pipe 4 and are introduced below the level of the absorbent petroleum carbon in the bomb 2. The absorbent material in the latter bomb has the ability of removing from these vapors the tarry substances and other impurities,—permitting only the lighter fractions to pass off through the vapor line 7 to the condenser and collecting tank.

It has been suggested that steam be introduced through the line 6 into the bomb 1. This may be done if desired, although it is not essential except with certain types of residual materials in which the tarry products are relatively fixed. Further, this steam may be used only intermittently—its purpose primarily being to combine with the volatile products given off from the substances in the initial bomb and serving to revivify or rejuvenate the absorbent petroleum carbon in the bomb 2. At 13 is shown an axially steam pipe which may be utilized to assist in reviving the absorbent petroleum carbon in the bomb 2.

In place of the batch operation, the apparatus may be so arranged as to permit of the continuous treatment of the residual materials,—thereby eliminating the necessity of shutting down the apparatus for cleaning. Pressures are maintained upon the separate stages according to the character of the material undergoing treatment. Pressures range from 100 to 850 pounds per square inch, though normally such pressures as from 250 to 500 pounds per square inch are sufficient to properly extract and drive off the volatile materials leaving a pure petroleum coke in the bomb numbered "1", similar in its characteristics to the absorbent petroleum carbon utilized in bomb numbered "2". The distillate recovered in the receiving or collecting tank 10 is a good quality liquid being only slightly discolored and having gravities ranging from 40° to 60° Baumé. Numerous tests on carbonaceous material recovered from the pressure distillation of hydrocarbon oils resulted in the production of a light distillate having a gravity of from 40° to 55° Baumé and a "lemon" color, the odor being substantially the same as the pressure distillate recovered during the cracking operation. This distillate, when properly refined, has substantially the characteristics of the material recovered from the pressure distillate resulting from cracking.

Where steam is used, the water and oil will settle out in distinct layers in the receiving tank so that they may be removed separately from the liquid drawoff line shown at 14.

The process permits the treatment of this heavy residual material whereby a light distillate may be recovered, while normally, by driving off the volatile materials from petroleum coke and residual oils, a black heavy fuel oil like material is recovered. The absorbent petroleum carbon interposed in the vapor travel serves as a barrier to these dirty products, permitting only the lighter fractions to pass over to the final condenser and a relatively clean distillate to be recovered.

It is recognized that it is common practice in this art to filter out or remove objectionable tarry products by the use of charcoal, bone black, fuller's earth and other purifying absorbent materials. It is thought, however, to be novel to treat the volatile materials, recovered from residual products of this character, with an absorbent petroleum carbon in the manner described. It is appreciated, further, that the character of the apparatus and the method of utilizing the process may be varied considerably without departing from the spirit of the invention. The experimental test or apparatus shown would necessarily be built on a commercial scale and preferably so that the process may be operated continuously. These changes would probably necessitate the utilization of double chambers for both the residual materials and the absorbent petroleum carbon or treating substance, as it would be desirable to cut out the chambers at intervals for rejuvenating the material and cleaning and replacing the carbon which is recovered and the residual products treated.

In addition to treating the volatile fractions recovered from heavy residual oils, it has been found by experimentation that absorbent petroleum carbon of the nature described can also be effectively utilized for refining and purifying cracked distillates, that is, by redistilling the product and passing the vapors through the absorbent petroleum carbon whereby the volatilized distillate is recovered as a decidedly improved liquid, the absorbent petroleum carbon having the qualities of refining out a greater part of the objectionable impurities.

In treating the residual liquids and coke-like material heretofore described, sufficient temperature must be imposed thereon to drive off the volatile matter, likewise, it may be found advantageous to heat the purifying or absorbent petroleum carbon in order that optimum conditions for extraction of the tarry products and other impurities be maintained.

I claim as my invention:—

1. A process for recovering light oils from heavy oils, consisting in distilling off the volatile material therefrom, passing the evolved vapors through an absorbent activated petroleum carbon, and condensing and collecting the treated vapors as distillate.

2. A process for recovering light oils from heavy oils, consisting in distilling off the volatile material therefrom, passing the evolved vapors through an absorbent activated petroleum carbon, and condensing and collecting the treated vapors as distillate, maintaining a controlled vapor pressure upon the material undergoing treatment.

3. A process for recovering light from heavy hydrocarbons, consisting in distilling off the volatile material therefrom, passing the evolved vapors through an absorbent activated petroleum carbon, promoting distillation and revivifying the absorbent material by the introduction of steam thereto.

4. A process for recovering light distillate from tarry residual products, resulting from the treatment of petroleum hydrocarbons, consisting in distilling off the volatile material therefrom, passing the evolved vapors through an absorbent activated petroleum carbon, and condensing and collecting the treated vapors as distillate.

5. A process for recovering light distillate from tarry residual products, resulting from the treatment of petroleum hydrocarbons, consisting in distilling off the volatile material therefrom, passing the evolved vapors through an absorbent activated petroleum carbon, and condensing and collecting the treated vapors as distillate, introducing steam thereto to promote vaporization of the volatile material and to revivify the absorbent petroleum carbon.

ALFRED OBERLE.